United States Patent
Krajenke et al.

(10) Patent No.: US 9,517,711 B2
(45) Date of Patent: Dec. 13, 2016

(54) TAILGATE ASSEMBLY WITH A STEP ASSIST HANDLE

(71) Applicant: GM GLOBAL TECHNOLOGY OPERATIONS LLC, Detroit, MI (US)

(72) Inventors: Gary W. Krajenke, Warren, MI (US); Anil A. Masih, Royal Oak, MI (US); Michael J. Green, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/694,261

(22) Filed: Apr. 23, 2015

(65) Prior Publication Data

US 2016/0311356 A1 Oct. 27, 2016

(51) Int. Cl.
*B60N 3/00* (2006.01)
*B60N 3/02* (2006.01)
*B62D 33/027* (2006.01)

(52) U.S. Cl.
CPC .......... *B60N 3/023* (2013.01); *B62D 33/0273* (2013.01)

(58) Field of Classification Search
CPC ............................ B60N 3/023; B62D 33/0273
USPC .......................... 296/1.02, 57.1, 62; 280/166
See application file for complete search history.

(56) References Cited

U.S. PATENT DOCUMENTS

| | | | | |
|---|---|---|---|---|
| 7,090,276 B1* | 8/2006 | Bruford | ............. | B62D 33/0273 296/1.02 |
| 7,530,619 B1* | 5/2009 | Bruford | .................... | B60R 3/02 296/1.02 |
| 7,673,922 B1* | 3/2010 | Grimes | ..................... | B60R 3/02 280/166 |
| 7,712,811 B2* | 5/2010 | Heaman | ............. | B62D 33/0273 296/26.08 |
| 8,919,853 B2* | 12/2014 | Krishnan | ............... | B62D 33/03 280/164.1 |
| 9,302,719 B1* | 4/2016 | Krishnan | .................. | B60R 3/02 296/62 |
| 2009/0273202 A1* | 11/2009 | Heaman | ............. | B62D 33/0273 296/26.1 |

* cited by examiner

*Primary Examiner* — Joseph D Pape
(74) *Attorney, Agent, or Firm* — Quinn Law Group, PLLC (57) ABSTRACT

A tailgate assembly includes a structure, and a handle assembly attached to the structure. The handle assembly is moveable relative to the structure between a stowed position, an intermediate position, and a deployed position. The handle assembly includes a connecting member that is attached to the structure. The connecting member is rotatable about a first axis relative to the structure. A handle portion is attached to the connecting member, and is rotatable about a second axis relative to the connecting member. The handle portion and the connecting member rotate in unison relative to the structure about the first axis, between the stowed position and the intermediate position, to position the handle portion outside an interior space of the structure. The handle portion rotates relative to the connecting member about the second axis, between the intermediate position and the deployed position, whereby a user may grasp the handle portion.

18 Claims, 6 Drawing Sheets

TAILGATE ASSEMBLY WITH A STEP ASSIST HANDLE

TECHNICAL FIELD

The disclosure generally relates to a tailgate assembly for a vehicle, and more specifically, to a tailgate assembly having a step assist handle.

BACKGROUND

Vehicles, such as but not limited to pick-up trucks, may include a tailgate assembly that is moveable to provide access to a cargo area of the vehicle. The tailgate assembly may include a deployable step to facilitate easier ingress and egress into the cargo area of the vehicle. The tailgate assembly may further be equipped with a step assist handle that a user may grasp while stepping into or out of the cargo area of the vehicle to help steady themselves.

SUMMARY

A tailgate assembly for a vehicle is provided. The tailgate assembly includes a structure, and a handle assembly attached to the structure. The handle assembly is moveable between a stowed position, an intermediate position, and a deployed position. The handle assembly includes a connecting member that is attached to the structure. The connecting member is rotatable about a first axis relative to the structure. A handle portion is attached to the connecting member, and is rotatable about a second axis relative to the connecting member. The handle portion and the connecting member rotate in unison relative to the structure about the first axis, between the stowed position and the intermediate position. The handle portion rotates relative to the connecting member about the second axis, between the intermediate position and the deployed position.

A vehicle is also provided. The vehicle includes a body, and a tailgate assembly. The tailgate assembly includes a structure that is moveably attached to the body. The structure defines an interior space. The tailgate assembly includes a handle assembly that is attached to the structure. The handle assembly is moveable between a stowed position, an intermediate position, and a deployed position. The tailgate assembly further includes a deployable step that is attached to the structure. The deployable step is moveable between a raised position concealing the handle assembly in the stowed position within the interior space of the structure, and a lowered position presenting a step and exposing the handle assembly. The handle assembly includes a connecting member that is attached to the structure. The connecting member is rotatable about a first axis relative to the structure. A handle portion is attached to the connecting member, and is rotatable about a second axis relative to the connecting member. The handle portion and the connecting member rotate in unison relative to the structure about the first axis, between the stowed position and the intermediate position. The handle portion rotates relative to the connecting member about the second axis, between the intermediate position and the deployed position.

Accordingly, the movement of the handle portion, between the stowed position and the intermediate position, and between the intermediate position and the deployed position, allows the handle portion to be stowed in an interior space of the tailgate assembly. When needed, a user may grasp the handle portion and rotate the handle portion about the first axis, from the stowed position into the intermediate position, thereby positioning the handle portion substantially outside the interior space. Once positioned outside the interior space of the tailgate assembly, the handle portion may be rotated about the second axis, from the intermediate position into the deployed position, whereby a user may grasp the handle to assist in ingress or egress into a cargo area of the vehicle, e.g., a bed of a pick-up truck.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
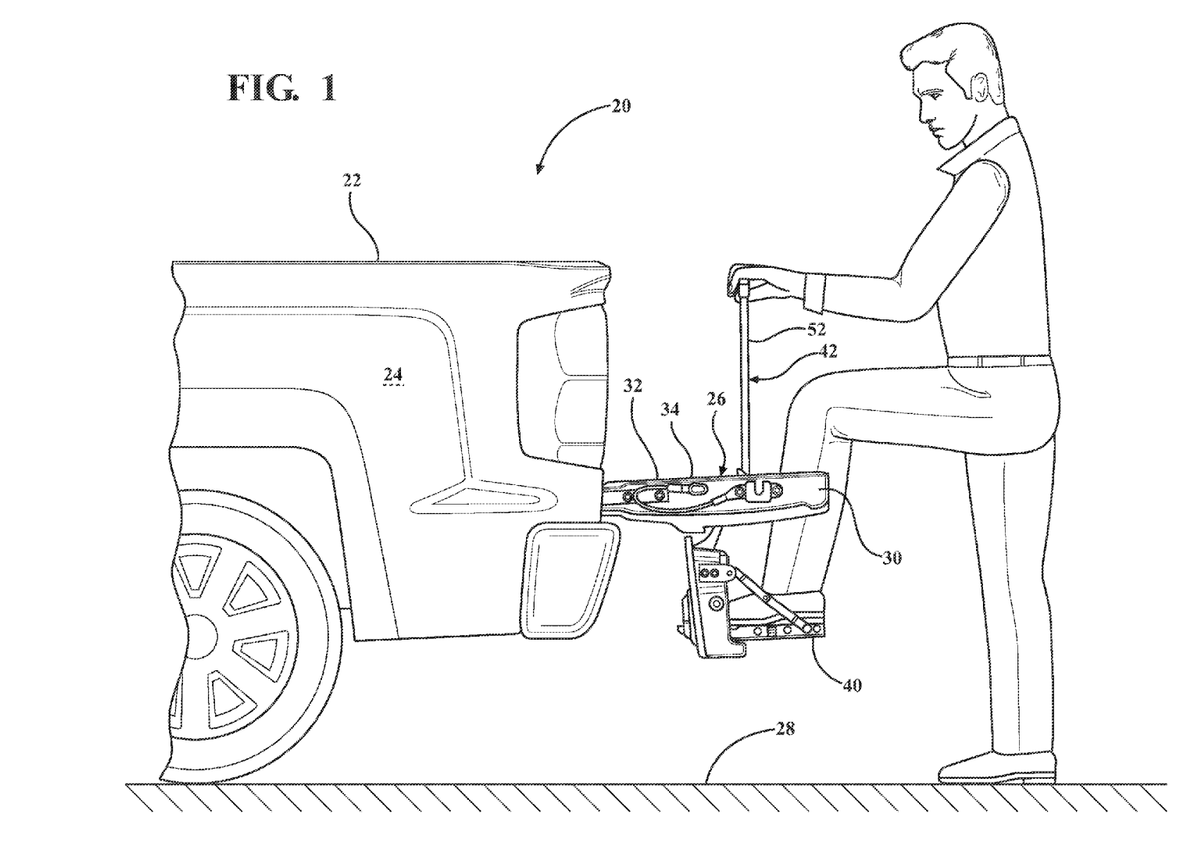
FIG. 1 is a schematic side view of a vehicle showing a tailgate assembly.

Referring to the Figures, wherein like numerals indicate like parts throughout the several views, a vehicle is generally shown at 20. Referring to FIG. 1, the vehicle 20 is shown as a pick-up truck having a body 22 that defines a bed, i.e., a cargo area 24. However, it should be appreciated that the vehicle 20 may be configured in some other style.

The body 22 includes a tailgate assembly 26. As shown, the tailgate assembly 26 is disposed at a rearward end of the body 22, and is moveably attached to the body 22 for movement between a closed position (not shown), and an open position (shown in FIG. 1). When the tailgate assembly 26 is disposed in the closed position, the tailgate assembly 26 closes or blocks access to the cargo area 24. When the tailgate is rotated or lowered into the open position, such as shown in FIG. 1, the tailgate assembly 26 allows access into the cargo area 24 of the body 22. As shown, the tailgate assembly 26 is positioned in an approximately vertical orientation relative to a ground surface 28 when disposed in the closed position, and is positioned in an approximately horizontal orientation relative to the ground surface 28 when disposed in the open position.

Figure 2:
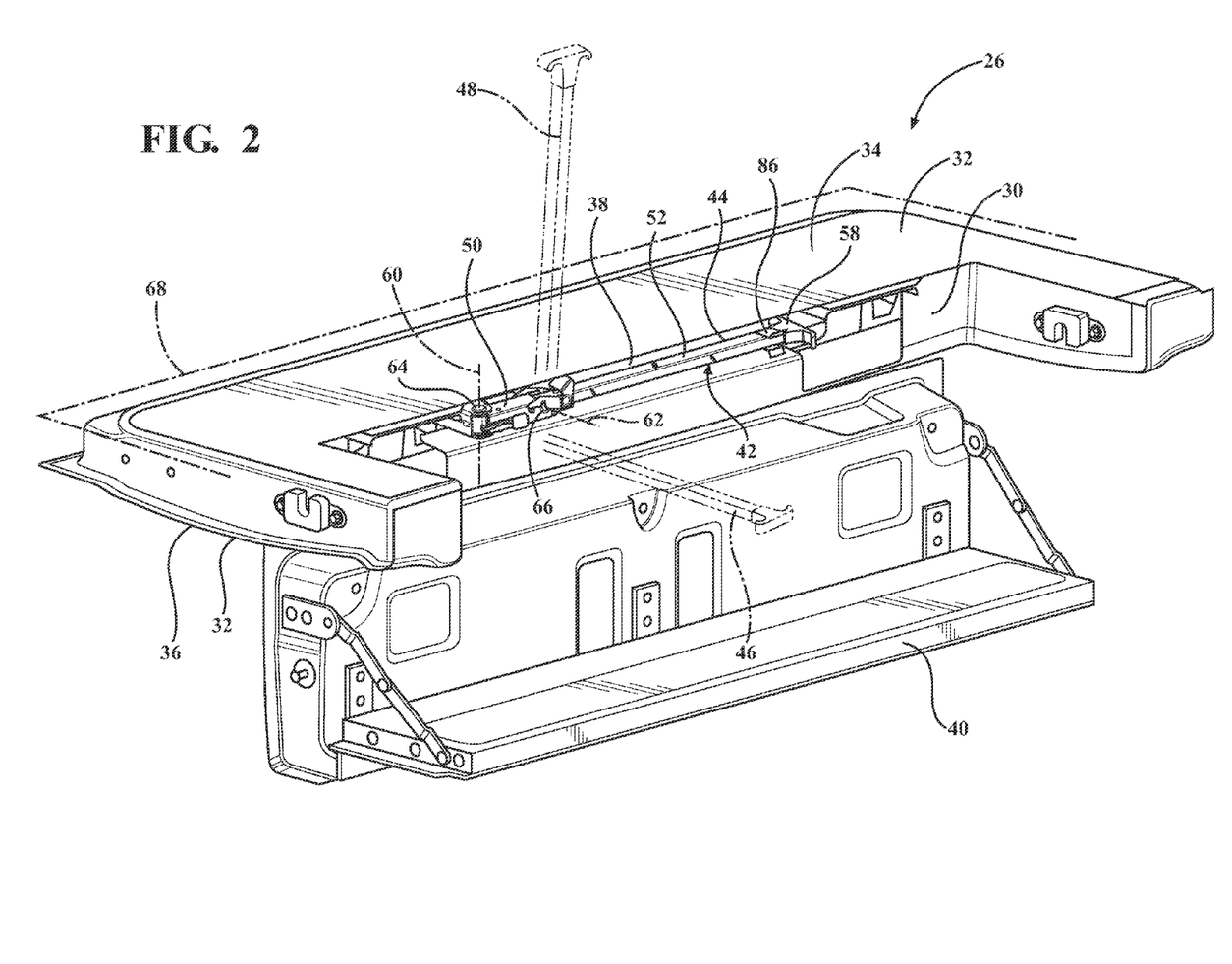
FIG. 2 is a schematic perspective view of the tailgate assembly.

Referring to FIG. 2, the tailgate assembly 26 includes a structure 30, which may be referred to as a frame or rigid support system. The structure 30 is moveably attached to the body 22 for rotating movement between the closed position and the open position. The structure 30 may include one or more panels 32, which may be mounted on the structure 30 to provide an interior surface 34 and/or and exterior surface 36 for the structure 30. The structure 30 is formed to define an interior space 38, e.g., a pocket. The interior space 38 is at least partially covered by the interior surface 34 and/or the exterior surface 36 of the structure 30, such as by one or more of the panels 32 attached to the structure 30.

As shown in FIGS. 1 and 2, the tailgate assembly 26 may further include a deployable step 40. The deployable step 40 is attached to the structure 30, and is moveable between a raised position (not shown) and a lowered position, such as shown in FIGS. 1 and 2. When disposed in the raised position, the deployable step 40 is concealed and not exposed. When the deployable step 40 is disposed in the lowered position, the deployable step 40 presents a step that is disposed at a lower elevation relative to the ground surface 28 than the structure 30 of the tailgate assembly 26, when the tailgate assembly 26 is disposed in the open position, for a user to step on during ingress or egress into or out of the cargo area 24 of the body 22.

Referring to FIG. 2, the tailgate assembly 26 includes a handle assembly 42. The handle assembly 42 is attached to the structure 30, and is moveable between a stowed position 44, an intermediate position 46, and a deployed position 48. The handle assembly 42 is disposed within the interior space 38 of the structure 30 when disposed in the stowed position 44, and is positioned to provide a grab bar or assist handle for a user stepping into or out of the cargo area 24 of the vehicle 20 when disposed in the deployed position 48. The intermediate position 46 is a position between the stowed position 44 and the deployed position 48, into which the handle assembly 42 must be moved to withdraw the handle assembly 42 from the interior space 38 of the structure 30 and move the handle assembly 42 into the deployed position 48. When the handle assembly 42 is positioned in the stowed position 44, and the deployable step 40 is positioned in the raised position, the handle assembly 42 is concealed by the deployable step 40, within the interior space 38 of the structure 30. When the deployable step 40 is positioned in the lowered position, the handle assembly 42 is exposed so that the user may grasp the handle assembly 42 and move the handle assembly 42 between the deployed position 48 and the stowed position 44.

Figure 3:
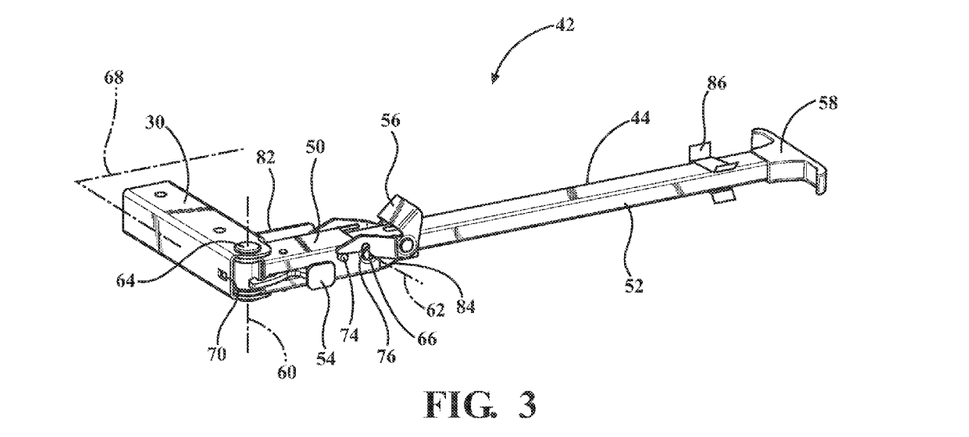
FIG. 3 is a schematic perspective view showing a handle assembly in a stowed position.
Figure 4:
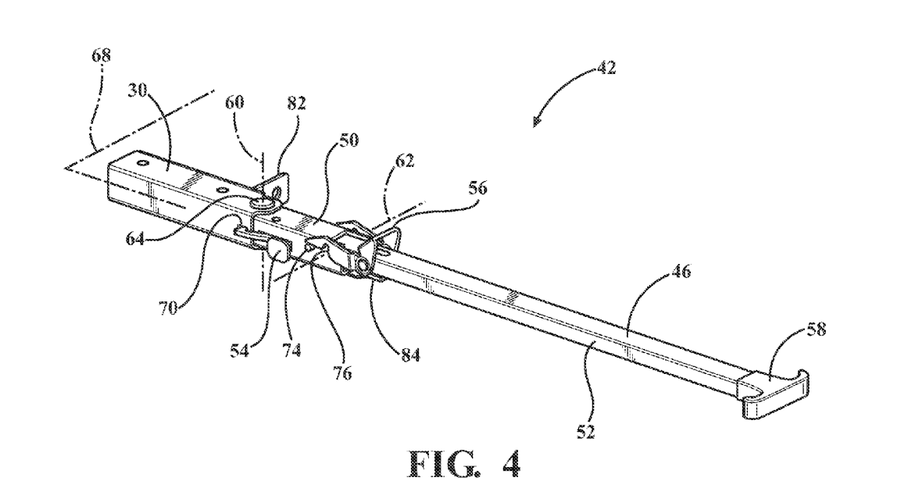
FIG. 4 is a schematic perspective view showing the handle assembly in an intermediate position.
Figure 5:
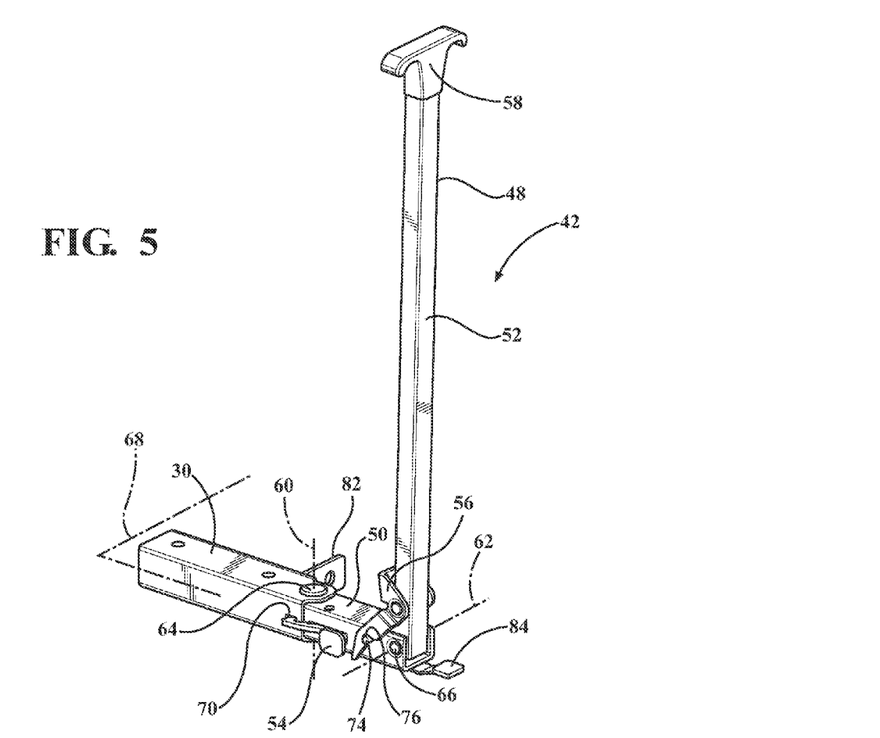
FIG. 5 is a schematic perspective view showing the handle assembly in a deployed position.

Referring to FIGS. 3-5, the handle assembly 42 includes a connecting member 50, a handle portion 52, a first latch 54, and a second latch 56. The handle portion 52 is an elongated member that includes the grip 58 which the user may grasp to steady themselves when stepping into or out of the cargo area 24. As shown in FIG. 2, the connecting member 50 is rotatably attached to the structure 30. As shown in FIGS. 3 through 5, the handle portion 52 is rotatably attached to the connecting member 50. The connecting member 50 and the handle portion 52 rotate in unison relative to the structure 30 about a first axis 60, to move between the stowed position 44 and the intermediate position 46. The handle portion 52 rotates relative to the connecting member 50 about a second axis 62, to move between the intermediate position 46 and the deployed position 48.

The handle assembly 42 includes a first pivot pin 64, and a second pivot pin 66. The first pivot pin 64 interconnects the structure 30 and the connecting member 50. A central longitudinal axis of the first pivot pin 64 defines the first axis 60. As shown, the structure 30 and the connecting member 50 each include a generally square tubular structure 30, with the connecting member 50 being smaller than the structure 30, and partially disposed within the interior of the structure 30. The first pivot pin 64 passes through opposing upper and lower side walls of both the structure 30 and the connecting member 50 to rotatably connect the connecting member 50 to the structure 30.

The second pivot pin 66 interconnects the handle portion 52 and the connecting member 50. A central longitudinal axis of the second pivot pin 66 defines the second axis 62. As shown, the connecting member 50 and the handle portion 52 each include a generally square tubular structure 30, with the handle portion 52 being smaller than the connecting member 50, and partially disposed within the interior of the connecting member 50. The second pivot pin 66 passes through opposing left and right side walls of both the connecting member 50 and the handle portion 52 to rotatably connect the handle portion 52 to the connecting member 50.

Referring to FIGS. 3 through 5, the second axis 62 is transverse to the first axis 60. Additionally, the second axis 62 is laterally offset relative to the first axis 60. The structure 30 is generally parallel with a tailgate plane 68. When the tailgate assembly 26 is disposed in the open position, the tailgate plane 68 is preferably disposed in a generally horizontal orientation, and parallel with the ground surface 28. The first axis 60 is generally perpendicular to the structure 30 and the tailgate plane 68. For example, when the tailgate assembly 26 is disposed in the open position, the first axis 60 is preferably disposed in a generally vertical orientation relative to the ground surface 28, and perpendicular to the tailgate plane 68, but may vary from vertical by as much as 10 degrees relative to the ground surface 28 and the tailgate plane 68. The second axis 62 is generally perpendicular to the second axis 62. The second axis 62 is generally parallel to the structure 30 and the tailgate plane 68. For example, when the tailgate assembly 26 is disposed in the open position, the second axis 62 is preferably disposed in a horizontal orientation relative to the ground surface 28 and parallel with the tailgate plane 68, but may vary from horizontal by as much as 10 degrees relative to the ground surface 28 and the tailgate plane 68. The first axis 60 and the second axis 62 do not move relative to each other. As such, when the tailgate is disposed in the open position, the first axis 60 is always disposed in the generally vertical orientation relative to the structure 30 and the tailgate plane 68, and the second axis 62 is always disposed in the general horizontal orientation relative to the structure 30 and the tailgate plane 68, regardless of which position the handle portion 52 is disposed in, i.e., the stowed position 44, the intermediate position 46, or the deployed position 48.

Figure 8:
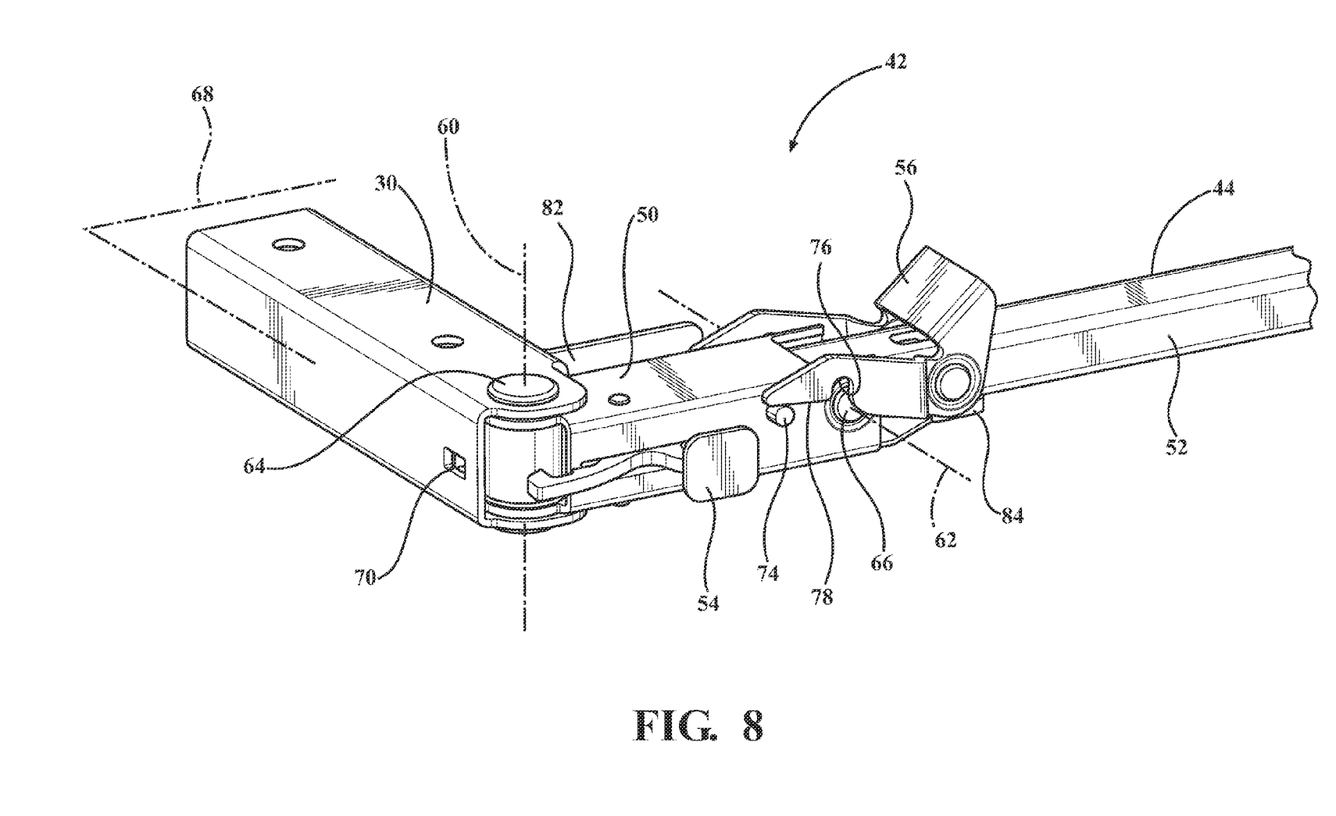
FIG. 8 is a fragmentary, schematic perspective view of the handle assembly in the stowed position, showing a first latch and the second latch.
Figure 9:
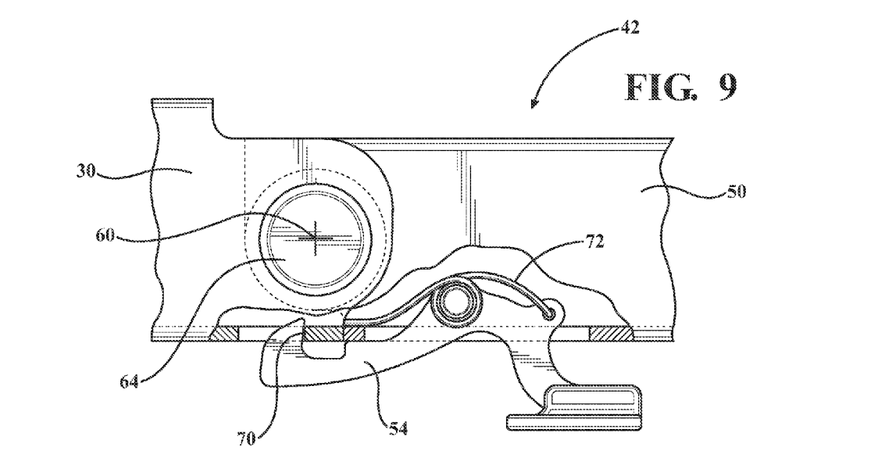
FIG. 9 is a fragmentary, schematic side view of the handle assembly showing the first latch when the handle assembly is disposed in the intermediate position and the deployed position.

As noted above, the handle assembly 42 includes the first latch 54, and the second latch 56. Referring to FIGS. 8 and 9, The first latch 54 is operable to latch the interconnecting member 50 to the structure 30, when the handle assembly 42 is disposed in the intermediate position 46 and the deployed position 48. As shown, the structure 30 includes a catch 70, and the first latch 54 is pivotably attached to and supported by the connecting member 50. The first latch 54 is operable to engage the catch 70 in latching engagement when the handle assembly 42 is disposed in the intermediate position 46 and the deployed position 48.

As shown in FIG. 9, the first latch 54 includes a first biasing device 72. The first biasing device 72 interconnects the first latch 54 and the structure 30. The first biasing device 72 biases the first latch 54 against the structure 30, so that the first latch 54 will engage the catch 70 in the structure 30 when the handle portion 52 is moved into the intermediate position 46. The first biasing device 72 may include, for example, a torsion spring or other similar device that interconnects the first latch 54 and the structure 30, and biases the first latch 54 into a latching position for engagement with the catch 70. The first biasing device 72 biases the first latch 54 into the latching position so that the first latch 54 automatically engages the catch 70 when the handle portion 52 is rotated into the intermediate position 46, thereby securing the handle portion 52 relative to the structure 30. The first latch 54 must be manually released in order for the handle portion 52 to rotate about the first axis 60, from the intermediate position 46 into the stowed position 44. It should be appreciated that the first latch 54 may be configured differently than the exemplary embodiment described herein and shown in the Figures.

Figure 6:
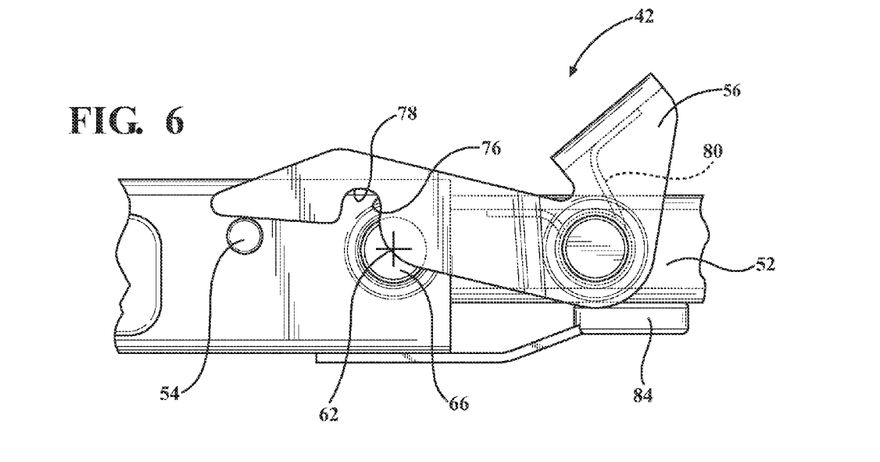
FIG. 6 is a fragmentary, schematic side view of the handle assembly showing a second latch when the handle assembly is disposed in the stowed position and the intermediate position.
Figure 7:
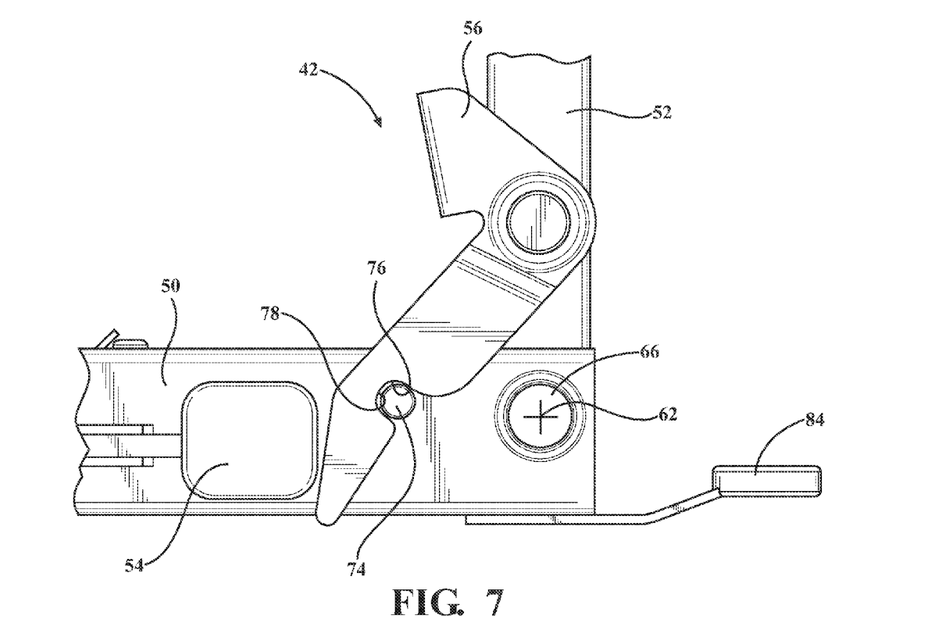
FIG. 7 is a fragmentary, schematic side view of the handle assembly showing the second latch when the handle assembly is disposed in the deployed position.

Referring to FIGS. 6 and 7, the second latch 56 is operable to latch the handle portion 52 to the connecting member 50, when the handle assembly 42 is disposed in the deployed position 48. As shown, the connecting member 50 includes a striker pin 74, which extends outward from the connecting member 50 in parallel with the second axis 62. Preferably, and as shown, the striker pin 74 extends outward from both the left and right side walls of the connecting member 50. The second latch 56 is rotatably attached to and supported by the handle portion 52. The second latch 56 includes a notch 76 that is operable to receive the striker pin 74 therein when the handle portion 52 is disposed in the deployed position 48. Preferably, and as shown, the second latch 56 includes opposing wings that are disposed adjunct the left and right side walls of the connecting member 50 respectively, with each of the opposing wings defining a respective notch 76 to engage the striker pin 74 extending from the right and left side walls of the connecting member 50 respectively. The second latch 56 generally defines a cam profile 78 that rides against the striker pin 74. Upon the handle portion 52 being rotated into the deployed position 48 from the intermediate position 46, the striker pin 74 engages the notch 76, such that the notch 76 slides onto and around the striker pin 74, thereby securing the handle portion 52 relative to the connecting member 50. The cam profile 78 of the notch 76 is designed to prevent disengagement of the interlocking arrangement between the striker pin 74 and the notch 76, unless the second latch 56 is manually operated to rotate the second latch 56 relative to the striker pin 74, to disengage the striker pin 74 from the notch 76.

As shown in FIG. 6, the second latch 56 includes a second biasing device 80. The second biasing device 80 interconnects the second latch 56 and the connecting member 50. The second biasing device 80 biases the second latch 56 against the connecting member 50, so that the notch 76 of the second latch 56 will engage the striker pin 74 on the connecting member 50 when the handle portion 52 is moved into the deployed position 48. The second biasing device 80 may include, for example, a torsion spring or other similar device that interconnects the second latch 56 and the connecting member 50, and biases the second latch 56 into a latching position and against the striker pin 74 for engagement with the striker pin 74. The second biasing device 80 biases the second latch 56 into the latching position so that the second latch 56 automatically engages the striker pin 74 when the handle portion 52 is rotated into the deployed position 48, thereby securing the handle portion 52 relative to the connecting member 50. The second latch 56 must be manually released in order for the handle portion 52 to rotate about the second axis 62. It should be appreciated that the second latch 56 may be configured differently than the exemplary embodiment described herein and shown in the Figures.

Referring to FIG. 8, the structure 30 may include a first stop 82 that contacts the connecting member 50 when the connecting member 50 is disposed in the stowed position 44. The first stop 82 is operable to prevent over rotation of the connecting member 50 relative to the structure 30, beyond the stowed position 44, when the connecting member 50 and the handle portion 52 rotate from the intermediate position 46 into the stowed position 44. As shown, the first stop 82 includes a plate that extends outward from the structure 30, and contacts the interconnecting member 50 upon the interconnecting member 50 being rotated into the stowed position 44. However, it should be appreciated that the first stop 82 may be configured differently than the exemplary embodiment described herein and shown in the Figures.

Referring to FIGS. 6 and 7, the connecting member 50 may further include a second stop 84. The second stop 84 contacts and supports the handle portion 52 when the handle portion 52 is disposed in the stowed position 44 and the intermediate position 46. The second stop 84 is operable to prevent over rotation of the handle portion 52 relative to the connecting member 50, when the handle portion 52 rotates from the deployed position 48 into the intermediate position 46. As shown, the second stop 84 includes an arm that extends outward from the connecting member 50, and is disposed below the handle portion 52. However, it should be appreciated that the second stop 84 may be configured differently than the exemplary embodiment described herein and shown in the Figures.

As shown in FIGS. 2 through 5, the tailgate assembly 26 may further include a stowage clip 86. The stowage clip 86 is attached to the structure 30, and is operable to secure the handle portion 52 in the stowed position 44 relative to the structure 30. As shown, the stowage clip 86 is located within the interior space 38 of the structure 30, and includes a generally C-shaped clip that snaps over the handle portion 52. However, it should be appreciated that the stowage clip 86 may be configured in some other manner not shown or described herein.

In order to deploy the handle assembly 42, the tailgate assembly 26 must first be rotated into the open position, and the deployable step 40 must be lowered into the lowered position, such as shown in FIG. 1. Moving the deployable step 40 into the lowered position exposes the handle assembly 42, which is concealed within the interior space 38 of the structure 30 in the stowed position 44. When the handle assembly 42 is positioned in the stowed position 44, a user may grasp the handle portion 52 and rotate the connecting member 50 and the handle portion 52 about the first axis 60, thereby disengaging the handle portion 52 from the stowage clip 86, and moving the connecting member 50 and the handle portion 52 into the intermediate position 46. When the tailgate assembly 26 is in the open position, and the handle assembly 42 is in the stowed position 44, the first axis 60 extends generally vertically relative to the ground surface 28. As such, rotating the handle portion 52 about the first axis 60 moves the grip 58 of the handle portion 52 rearward of the structure 30, and out of the interior space 38. Once the connecting member 50 and the handle portion 52 have been rotated about the first axis 60 into the intermediate position 46, the first latch 54 automatically engages to secure the connecting member 50 relative to the structure 30, and prevent rotation of the connecting member 50 and/or the handle portion 52 about the first axis 60.

Once the connecting member 50 and the handle portion 52 are positioned in the intermediate position 46, the user may rotate the handle portion 52 about the second axis 62, relative to the connecting member 50, thereby moving the handle portion 52 into the deployed position 48. When the tailgate assembly 26 is in the open position, and the handle assembly 42 is in the intermediate position 46, the second axis 62 extends generally horizontally relative to the ground surface 28. As such, rotating the handle portion 52 about the second axis 62 rotates the grip 58 of the handle portion 52 upward relative to the structure 30, into a generally vertical orientation that is appropriate for the user to grasp to assist ingress and egress into and out of the cargo area 24. Once the handle portion 52 has been rotated about the second axis 62 into the deployed position 48, the second latch 56 automatically engages to secure the handle portion 52 relative to the connecting member 50, and prevent rotation of the handle portion 52 about the second axis 62.

In order to move the handle assembly 42 from the deployed position 48 into the stowed position 44, the process described above is generally reversed. However, because the first biasing device 72 biases the first latch 54 into interlocking engagement with the structure 30, and the second biasing device 80 biases the second latch 56 into interlocking engagement with the connecting member 50, the first latch 54 and the second latch 56 must be manually manipulated to release the interlocking engagement of the first latch 54 and the second latch 56 respectively. As such, the user must first disengage the second latch 56 to allow the handle portion 52 to rotate bout the second axis 62, from the deployed position 48 into the intermediate position 46. Upon the handle portion 52 moving into the intermediate position 46, the user must disengage the first latch 54 to allow the connecting member 50 and the handle portion 52 to rotate about the first axis 60, from the intermediate position 46 into the stowed position 44.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A tailgate assembly for a vehicle, the tailgate assembly comprising:
   a structure;
   a handle assembly attached to the structure and moveable between a stowed position, an intermediate position, and a deployed position, wherein the handle assembly includes:
      a connecting member attached to the structure and rotatable about a first axis relative to the structure;
      a handle portion attached to the connecting member and rotatable about a second axis relative to the connecting member;
      wherein the handle portion and the connecting member rotate in unison relative to the structure about the first axis between the stowed position and the intermediate position; and
      wherein the handle portion rotates relative to the connecting member about the second axis between the intermediate position and the deployed position.

2. The tailgate assembly set forth in claim 1 wherein the second axis is transverse to the first axis, and wherein the second axis is laterally offset relative to the first axis.

3. The tailgate assembly set forth in claim 2 wherein the handle assembly includes a first pivot pin interconnecting the structure and the connecting member, wherein a central longitudinal axis of the first pivot pin defines the first axis.

4. The tailgate assembly set forth in claim 3 wherein the handle assembly includes a second pivot pin interconnecting the handle portion and the connecting member, wherein a central longitudinal axis of the second pivot pin defines the second axis.

5. The tailgate assembly set forth in claim 1 wherein the handle assembly includes a first latch operable to latch the interconnecting member to the structure when the handle assembly is disposed in the intermediate position and the deployed position.

6. The tailgate assembly set forth in claim 5 wherein the structure includes a catch, and the first latch is pivotably attached to and supported by the connecting member, wherein the first latch is operable to engage the catch in latching engagement when the handle assembly is disposed in the intermediate position and the deployed position.

7. The tailgate assembly set forth in claim 6 further comprising a first biasing device interconnecting the first latch and the structure, and biasing the first latch against the structure.

8. The tailgate assembly set forth in claim 1 wherein the handle assembly includes a second latch operable to latch the handle portion to the connecting member when the handle portion is disposed in the deployed position.

9. The tailgate assembly set forth in claim 8 wherein the connecting member includes a striker pin extending outward from the connecting member in parallel with the second axis.

10. The tailgate assembly set forth in claim 9 wherein the second latch is rotatably attached to and supported by the handle portion, and includes a notch operable to receive the striker pin therein when the handle portion is disposed in the deployed position.

11. The tailgate assembly set forth in claim 10 further comprising a second biasing device interconnecting the second latch and the handle portion, and biasing the second latch against the striker pin.

12. The tailgate assembly set forth in claim 1 further comprising a stowage clip attached to the structure and operable to secure the handle portion in the stowed position relative to the structure.

13. The tailgate assembly set forth in claim 1 wherein the structure defines an interior space, with the handle assembly disposed within the interior space when in the stowed position, and wherein the tailgate assembly further comprises a deployable step attached to the structure and moveable between a stowed position concealing the handle assembly within the interior space of the structure, and a lowered position presenting a step and exposing the handle assembly.

14. A vehicle comprising:
   a body;
   a tailgate assembly having a structure moveably attached to the body, and defining an interior space;
   wherein the tailgate assembly includes a handle assembly attached to the structure and moveable between a stowed position, an intermediate position, and a deployed position, and wherein the tailgate assembly further includes a deployable step attached to the structure and moveable between a raised position concealing the handle assembly in the stowed position within the interior space of the structure, and a lowered position presenting a step and exposing the handle assembly;

wherein the handle assembly includes:
- a connecting member attached to the structure and rotatable about a first axis relative to the structure;
- a handle portion attached to the connecting member and rotatable about a second axis relative to the connecting member;
- wherein the handle portion and the connecting member rotate in unison relative to the structure about the first axis between the stowed position and the intermediate position; and
- wherein the handle portion rotates relative to the connecting member about the second axis between the intermediate position and the deployed position.

15. The vehicle set forth in claim 14 wherein the second axis is transverse to the first axis, and wherein the second axis is laterally offset relative to the first axis.

16. The vehicle set forth in claim 14 wherein the structure includes a catch, and wherein the handle assembly includes a first latch pivotably attached to and supported by the connecting member, and operable to engage the catch in latching engagement when the handle assembly is disposed in the intermediate position and the deployed position.

17. The vehicle set forth in claim 16 wherein the connecting member includes a striker pin extending outward from the connecting member in parallel with the second axis, and wherein the handle assembly includes a second latch rotatably attached to and supported by the handle portion, wherein the second latch includes a notch operable to receive the striker pin therein when the handle portion is disposed in the deployed position to latch the handle portion to the connecting member.

18. The vehicle set forth in claim 17 further comprising a first biasing device interconnecting the first latch and the structure, and biasing the first latch against the structure, and a second biasing device interconnecting the second latch and the handle portion, and biasing the second latch against the striker pin.

\* \* \* \* \*